United States Patent
Choi

(10) Patent No.: US 7,061,520 B2
(45) Date of Patent: Jun. 13, 2006

(54) APPARATUS AND METHOD FOR ADJUSTING PHOTOGRAPHING ANGLE OF CAMERA IN PORTABLE TERMINAL

(75) Inventor: Young Choi, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 91 days.

(21) Appl. No.: 10/753,396

(22) Filed: Jan. 9, 2004

(65) Prior Publication Data
US 2004/0145653 A1 Jul. 29, 2004

(30) Foreign Application Priority Data
Jan. 11, 2003 (KR) ................. 10-2003-0001825

(51) Int. Cl.
*H04N 7/14* (2006.01)

(52) U.S. Cl. .................. 348/14.02; 348/14.01; 348/373; 348/376; 455/575.1

(58) Field of Classification Search .. 348/14.01–14.09, 348/14.16, 333.06, 333.01, 207.99, 373, 348/375, 376; 379/433.13, 434, 575.3; 455/571.1, 455/566, 575.1
See application file for complete search history.

(56) References Cited

U.S. PATENT DOCUMENTS

| | | | |
|---|---|---|---|
| 6,314,183 B1 * | 11/2001 | Pehrsson et al. | 379/433.06 |
| 2003/0125080 A1 * | 7/2003 | Shimamura | 455/556 |
| 2003/0227564 A1 * | 12/2003 | Lim | 348/375 |

FOREIGN PATENT DOCUMENTS

JP 02002125025 A * 4/2002

* cited by examiner

*Primary Examiner*—Melur Ramakrishnaiah
(74) *Attorney, Agent, or Firm*—Roylance, Abrams, Berdo & Goodman, L.L.P.

(57) ABSTRACT

An apparatus and method for controlling a camera equipped in a portable terminal including a first housing having the camera and a second housing having a display section. The apparatus includes a first sensor installed at a predetermined position of the second housing, a second sensor installed at a predetermined position of the first housing in such a manner that the second sensor faces the first sensor when the second housing is in a closed position with respect to the first housing and generating on/off signals depending on a relationship with respect to the first sensor, a motor driving section for generating a driving signal in order to adjust a photographing angle of a lens of the camera to a predetermined photographing angle when a signal representing an opening of the second housing is generated from the second sensor, and a motor for rotating the lens of the camera according to the motor driving signal.

11 Claims, 10 Drawing Sheets

APPARATUS AND METHOD FOR ADJUSTING PHOTOGRAPHING ANGLE OF CAMERA IN PORTABLE TERMINAL

CROSS REFERENCE TO RELATED APPLICATIONS

This application claims priority under 35 U.S.C. §119 to an application entitled "Apparatus And Method For Adjusting Photographing Angle Of Camera In Portable Terminal" filed in the Korean Industrial Property Office on Jan. 11, 2003 and assigned Serial No. 2003-1825, the entire content of which is incorporated herein by reference.

BACKGROUND OF THE INVENTION

1. Field of the Invention

The present invention relates to an apparatus and method for controlling a camera of a portable terminal, and more particularly to an apparatus and a method for adjusting a photographing angle of a camera in a portable terminal according to a state of a display section.

2. Description of the Related Art

Recently, structures of portable mobile communication terminals have been changed in order to provide high speed data communication in addition to basic voice communication. That is, if an IMT 2000 mobile communication network has been realized, it is possible to provide data communication as well as voice communication by using a mobile terminal. The mobile terminal capable of performing data communication can process data including image data.

As enterprises and consumers increasingly demand moving picture mail, services for providing the moving picture mail have been developed. These kinds of services may significantly increase in the future. Accordingly, it is generally expected that a user may photograph a moving picture by connecting a camera to a mobile terminal and send the moving picture to other terminals or mail servers. In addition, mobile terminals equipped with cameras having the above functions have been developed and put on the market. The camera coupled with the mobile terminal is typically divided into an internal type camera and an external type camera. It is expected that demand for the mobile terminals equipped with such an internal type camera may increase.

The portable terminal includes a body, a folder having a display section, and a hinge device for connecting the body to the folder. If a user photographs an image signal by using the portable terminal equipped with the internal type camera, the photographed image signal is displayed in the display section as an image. At this time, the user can adjust a photographing angle of the camera based on the image displayed in the display section. In order to adjust the photographing angle of the camera, the user must adjust a position of the camera or a position of the portable terminal. That is, when photographing the image signal by using the portable terminal, the user must manually manipulate components surrounding the camera or the hinge device for adjusting the photographing angle of the camera. However, it is inconvenient for the user if the user manually manipulates the camera of the portable camera for adjusting the photographing angle of the camera.

Accordingly, a need exists for an apparatus and method for conveniently adjusting a photographing angle of a camera in a portable terminal.

SUMMARY OF THE INVENTION

It is therefore an object of the present invention to solve the above-mentioned problems, and provide an apparatus and method for automatically adjusting a photographing angle of a camera according to a state of a display section in a portable terminal equipped with the camera.

Another object of the present invention is to provide an apparatus and method for automatically adjusting a photographing angle of a camera to a predetermined angle according to a state of a display section in a portable terminal equipped with the camera when the portable terminal is in a photographing mode.

Still another object of the present invention is to provide an apparatus and method capable of automatically adjusting a photographing angle of a camera to a predetermined angle, and which is capable of presetting the photographing angle of the camera in a portable terminal equipped with the camera when the portable terminal is in a photographing mode.

BRIEF DESCRIPTION OF THE DRAWINGS

The above objects and other features and advantages of the present invention will be more apparent from the following detailed description taken in conjunction with the accompanying drawings, in which.

DETAILED DESCRIPTION OF THE PREFERRED EMBODIMENTS

Figure 1A:
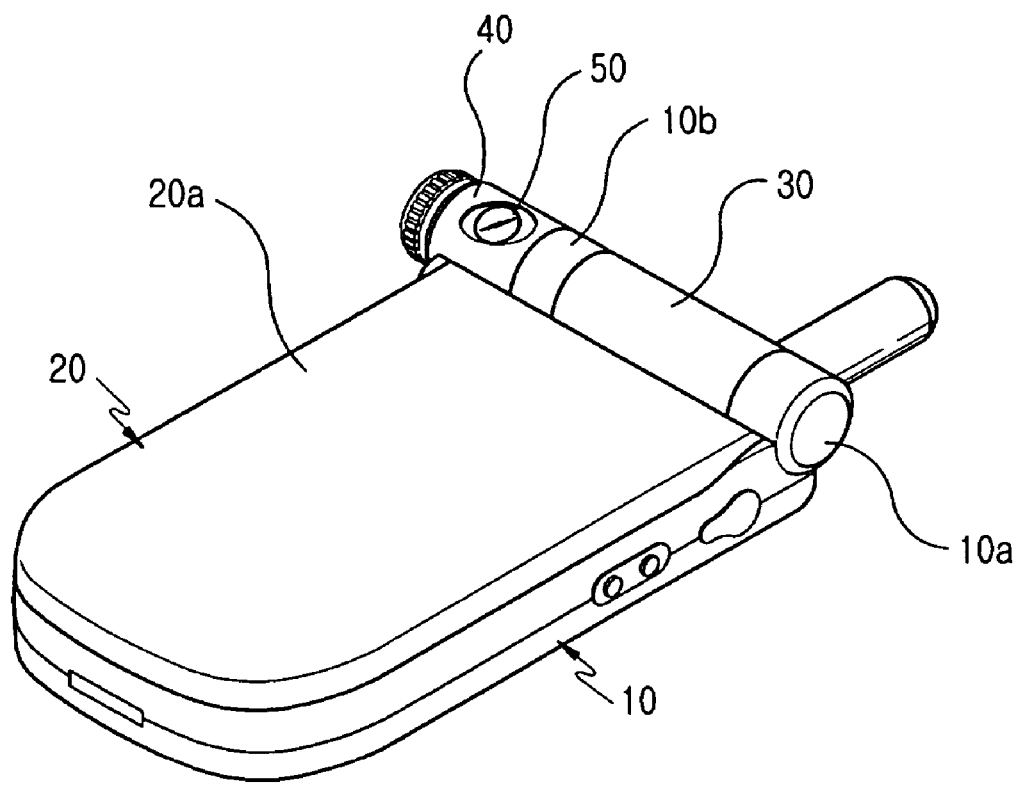
FIG. 1A is a perspective view showing an example portable terminal having a camera according to a first embodiment of the present invention.

Hereinafter, a preferred embodiment of the present invention will be described with reference to the accompanying drawings. Although certain limitations, such as an opening angle of a second housing of a portable terminal and a photographing angle of a camera, are specifically defined in the following description of the present invention, it will be obvious to those skilled in the art that such limitations are merely to improve understanding of the present invention and that the present invention can be performed without such specific limitations. Also, in the following description of the present invention, the same reference numerals are used to designate the same or similar components and a detailed description of known functions and configurations incorporated herein will be omitted when it may make the subject matter of the present invention unclear.

In the following description, a first housing signifies a body of a portable terminal, and a second housing represents a folder device including a display section.

A photographing angle of a camera means a lens angle of the camera.

FIG. 1 is a perspective view showing an external appearance of an example folder-type portable terminal according to an embodiment of the present invention.

Referring to FIG. 1, the folder-type portable includes a first housing 10, a second housing 20, and a two-axis hinge device for connecting the first housing 10 to the second housing 20 in such a manner that the first housing 10 is rotatably coupled to the second housing 20 about first and second hinge axis A1 and A2. The second housing 20 is rotatable from the first housing 10 at an angle of at or about 120° to at or about 150° about the first hinge axis A1, and is rotatable about the second hinge axis A2 at an angle of at or about 180°. At this time, the first hinge axis A1 is aligned perpendicular to the second hinge axis A2. The two-axis hinge device, which is not illustrated because it is accommodated in a center hinge arm 30, provides the first and second hinge axes A1 and A2 in order to allow the second housing 20 to rotate about the first and second hinge axes A1 and A2.

The first housing 10 is provided with an upper surface 10c thereof with a key array 12 including a plurality of keys. A microphone 14 is aligned adjacent to the key array 12. The key array includes basic number keys, a communication key, an end key, a navigation key, a control key and a photographing key.

The second housing 20 has an upper surface 20a and a lower surface 20b. The upper surface 20a is a flat surface and the lower surface 20b is provided with a speaker 22 and a display device 24.

In addition, a camera housing 40, a first side hinge arm 10a, a center hinge arm 30, and a second side hinge arm 10b are sequentially aligned in a first hinge axis direction in order to carry out a hinge function. The camera lens housing 40 has a cylindrical shape and is rotated within a predetermined range about the first hinge axis A1. The camera lens housing 40 faces the first hinge arm 10a. In addition, the center hinge arm 30 is coupled between the first and second side hinge arms 10a and 10b in order to rotatably connect the second housing 20 to the first housing 10 about the first and second hinge axes A1 and A2.

Figure 1B:
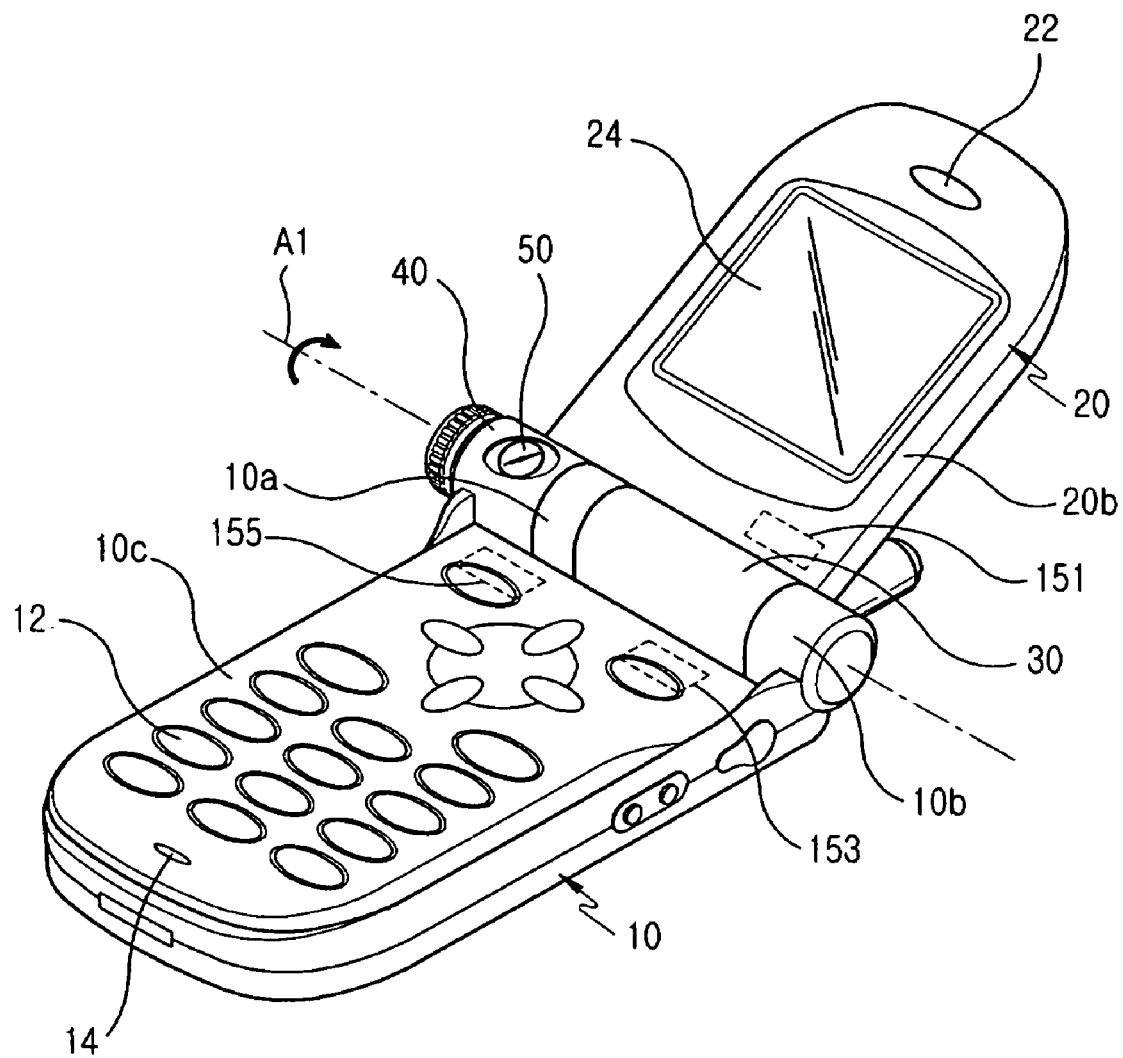
FIG. 1B is a perspective view showing an example portable terminal having a camera according to a first embodiment of the present invention in which a second housing is opened at an angle of 135° or approximately 135° about a first hinge shaft.
Figure 1C:
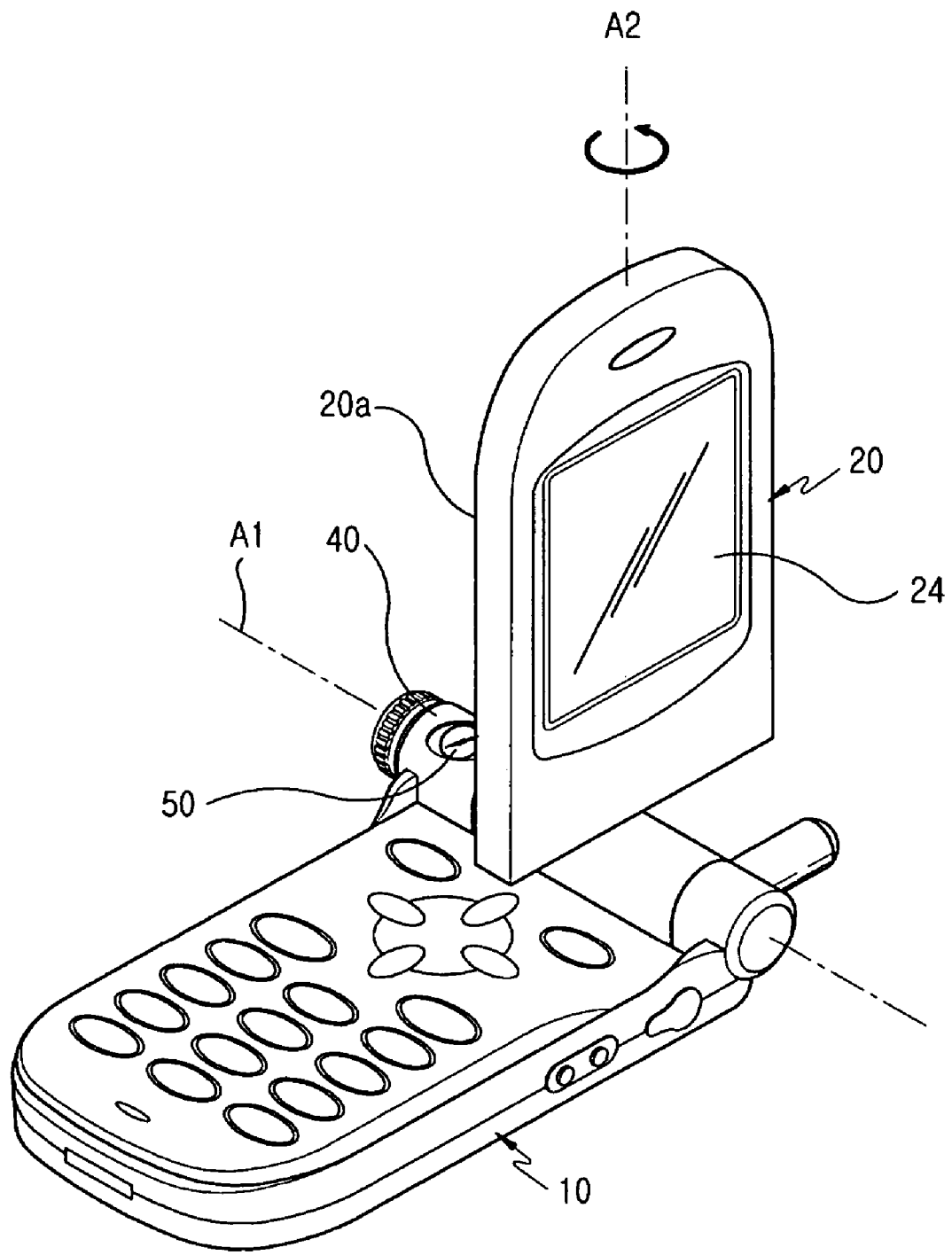
FIG. 1C is a perspective view showing an example portable terminal having a camera according to a second embodiment of the present invention in which a second housing is opened at an angle of 90° or approximately 90° about a second hinge shaft.
Figure 1D:
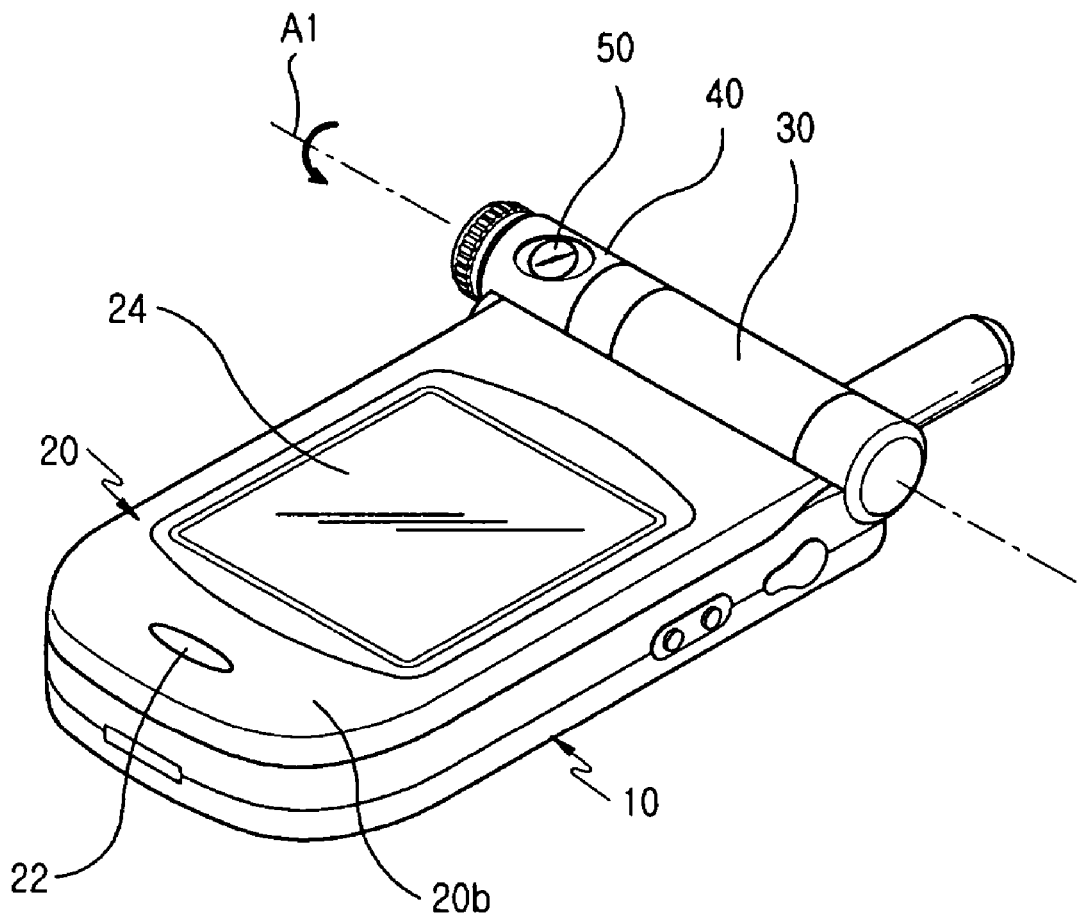
FIG. 1D is a perspective view showing an example portable terminal having a camera according to a second embodiment of the present invention.

FIG. 1A shows the portable terminal when the second housing 20 is in a closed position, which means that the second housing 20 overlaps the first housing 10, and FIG. 1B shows the portable terminal when the second housing 20 is in an open position, which means that the second housing 20 is completely rotated and opened about the first hinge axis A1. In addition, FIG. 1C represents the portable terminal when the second housing 20 is rotated at an angle of at or about +90° with respect to the first housing 10 about the second hinge axis A2, and FIG. 1D represents the portable terminal when the second housing 20 is in the closed position after rotating about the second hinge axis A2 by an angle of at or about +180°.

The camera housing 40 also includes a camera lens 50. A camera sensor coupled to the camera lens 50 and circuit sections for processing signals photographed by the camera sensor are installed in the first housing 10, and are not illustrated in the figures. A flexible circuit (not shown) is withdrawn in a first hinge axis direction and extends from the first side hinge arm 10a to a main printed circuit board accommodated in the first housing 10.

In addition, as shown in FIG. 1B, a first sensor 151 is aligned in the second housing 20 and at least one sensor is aligned in the first housing 10 in order to detect the first sensor 151. According to a preferred embodiment of the present invention as shown in FIG. 1B, second and third sensors 153 and 155 are aligned in the first housing 10. The first sensor 151 includes a magnet and the second and third sensors 153 and 155 include Hall effect integrated circuit (IC) components. The second and third sensors 153 and 155 are devices for detecting a position status of the second housing 20.

When the second housing 20 is in the closed position with respect to the first housing 10 as shown in FIG. 1A, the second sensor 153 maintains an "on" state by means of the first sensor 151. In addition, if the second housing 20 is positioned on the first housing 10 after the second housing 20 is rotated at an angle of 180° with respect to the first housing 10 as shown in FIG. 1D, the third sensor 155 maintains an "on" state by means of the first sensor 151.

Figure 2:
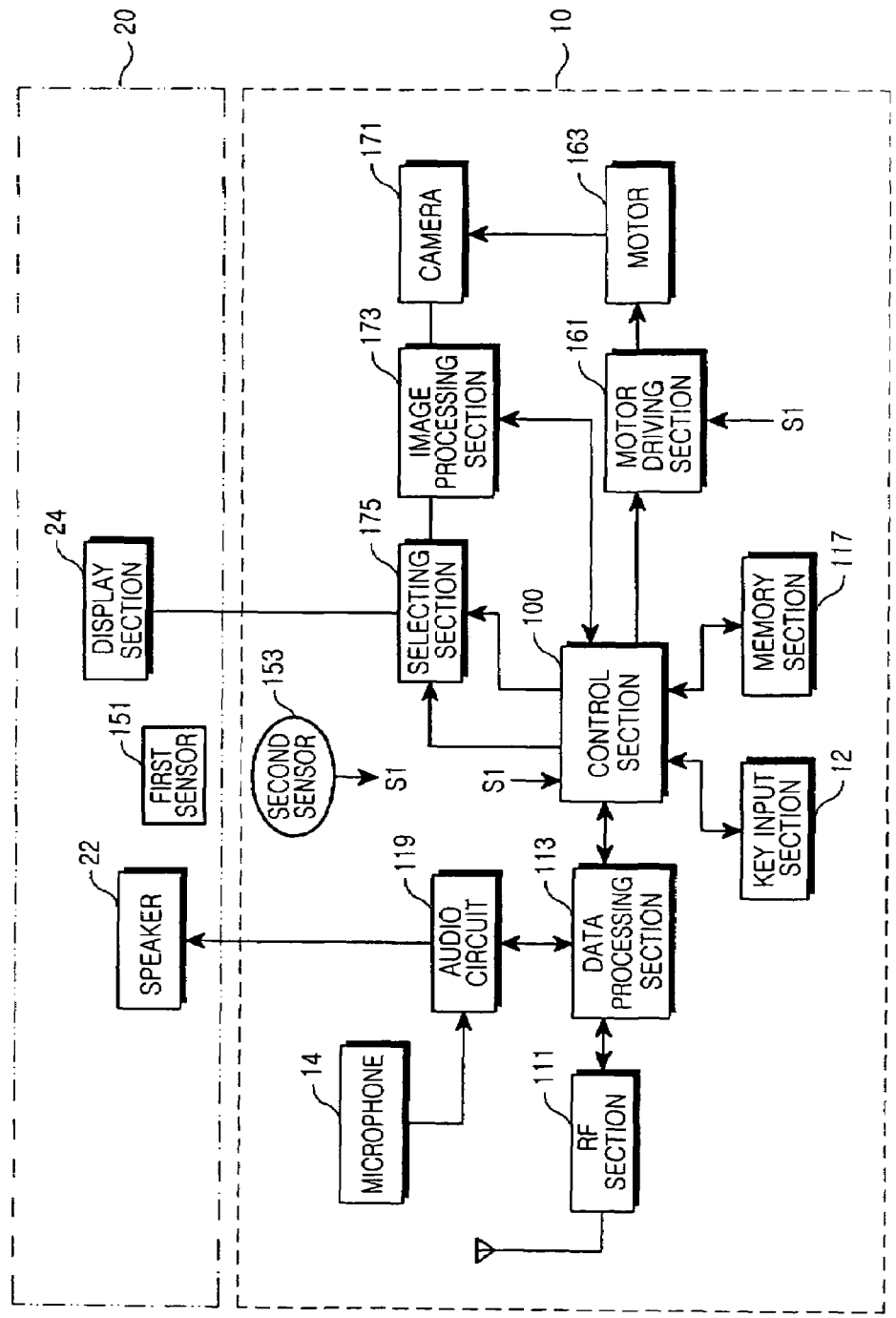
FIG. 2 is a block diagram showing an example structure of a portable terminal according to a first embodiment of the present invention.
Figure 3:
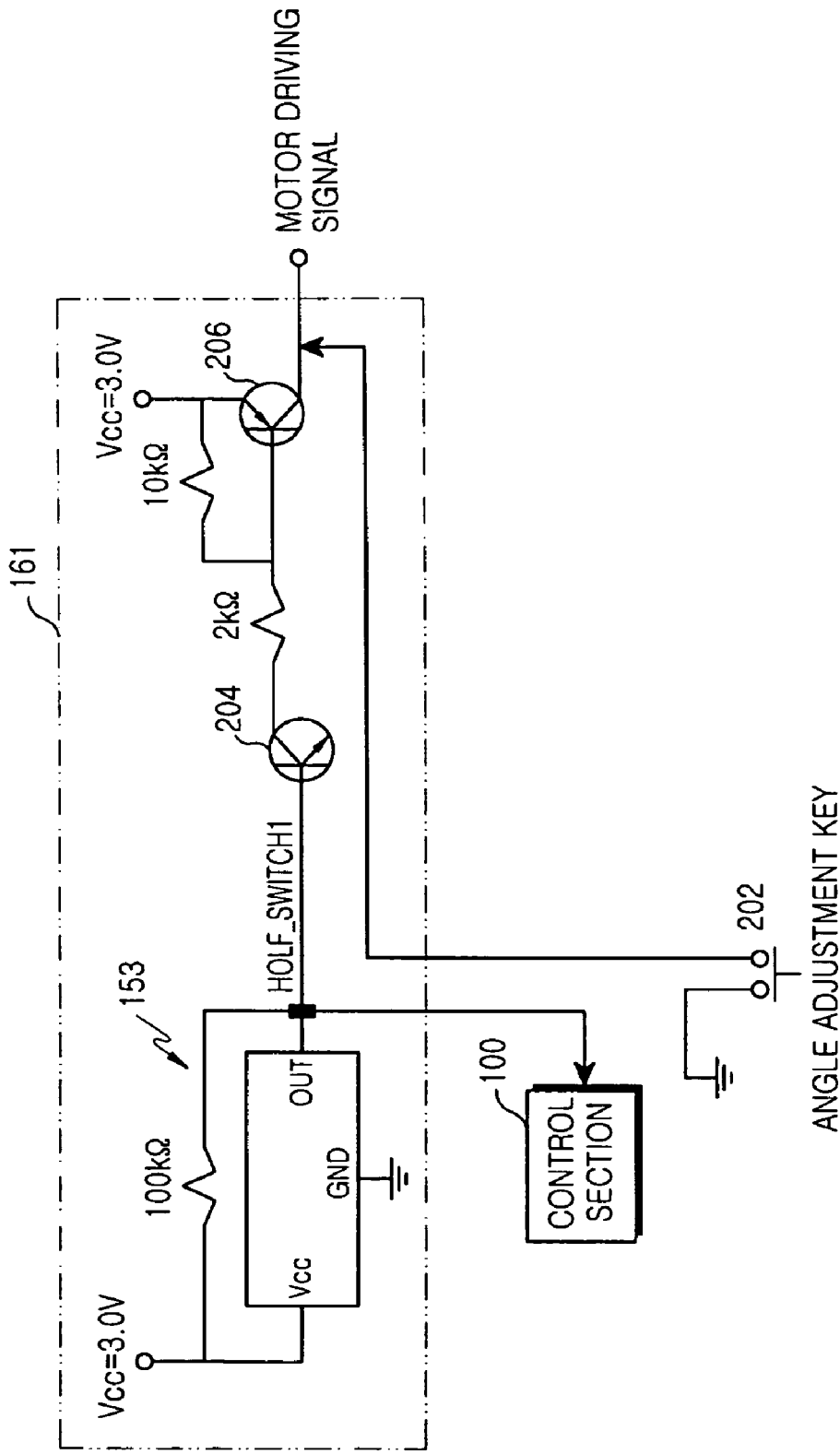
FIG. 3 is a schematic showing an example circuit structure for controlling a photographing angle of a camera in a portable terminal as shown in FIG. 2.
Figure 4:
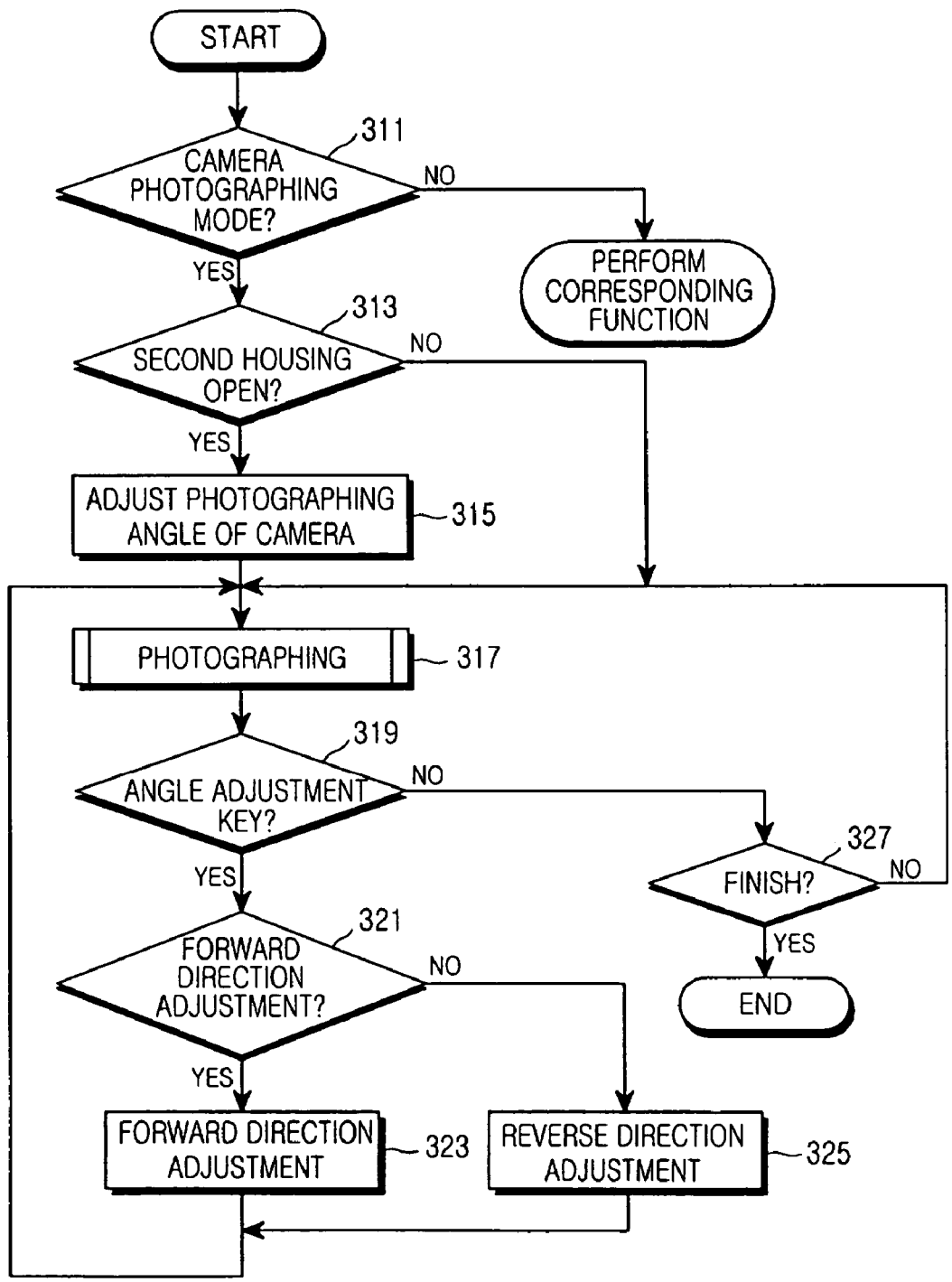
FIG. 4 is a flow chart showing an example procedure for automatically adjusting a photographing angle of a camera according to a first embodiment of the present invention.
Figure 5:
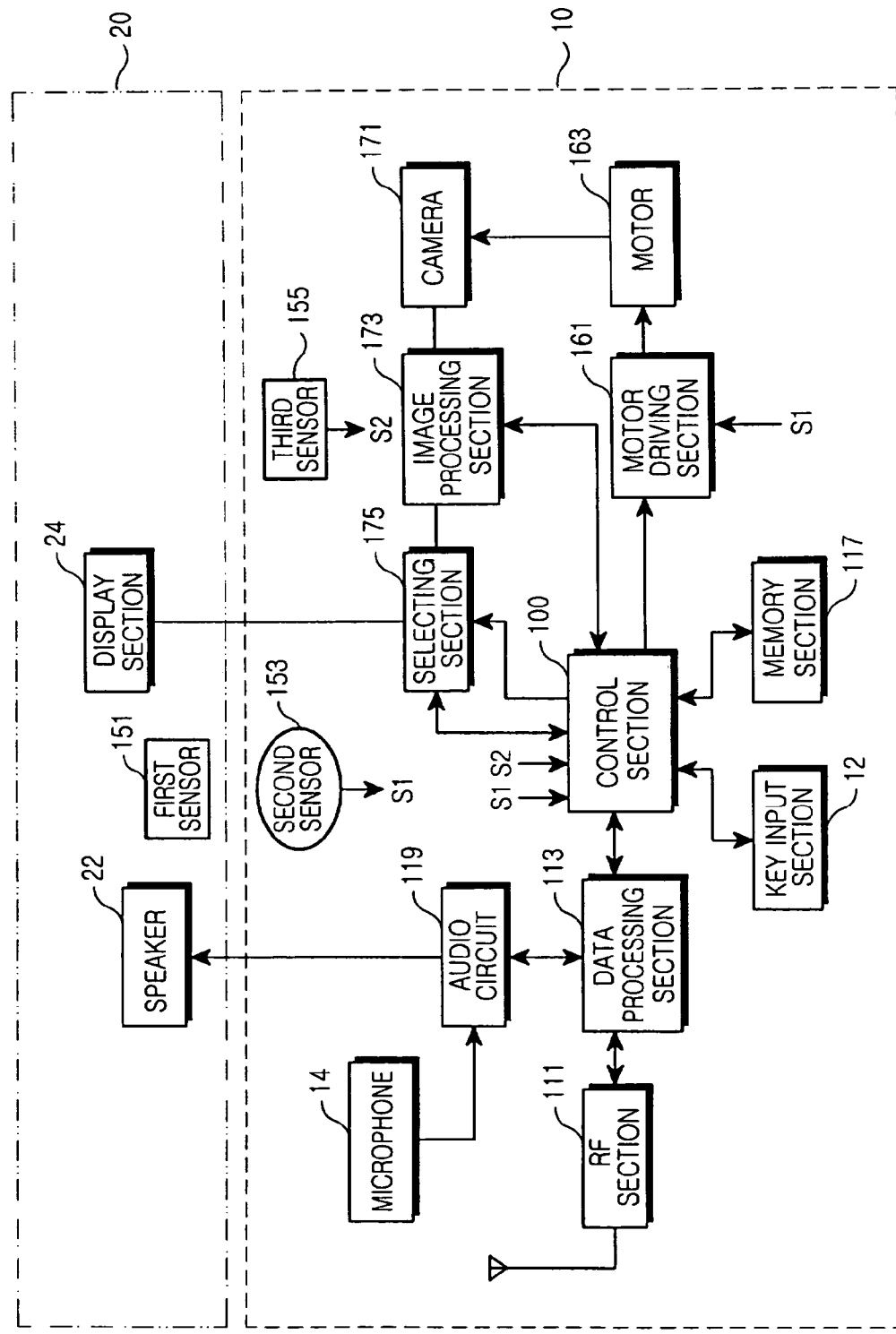
FIG. 5 is a block diagram showing an example structure of a portable terminal according to a second embodiment of the present invention.
Figure 6:
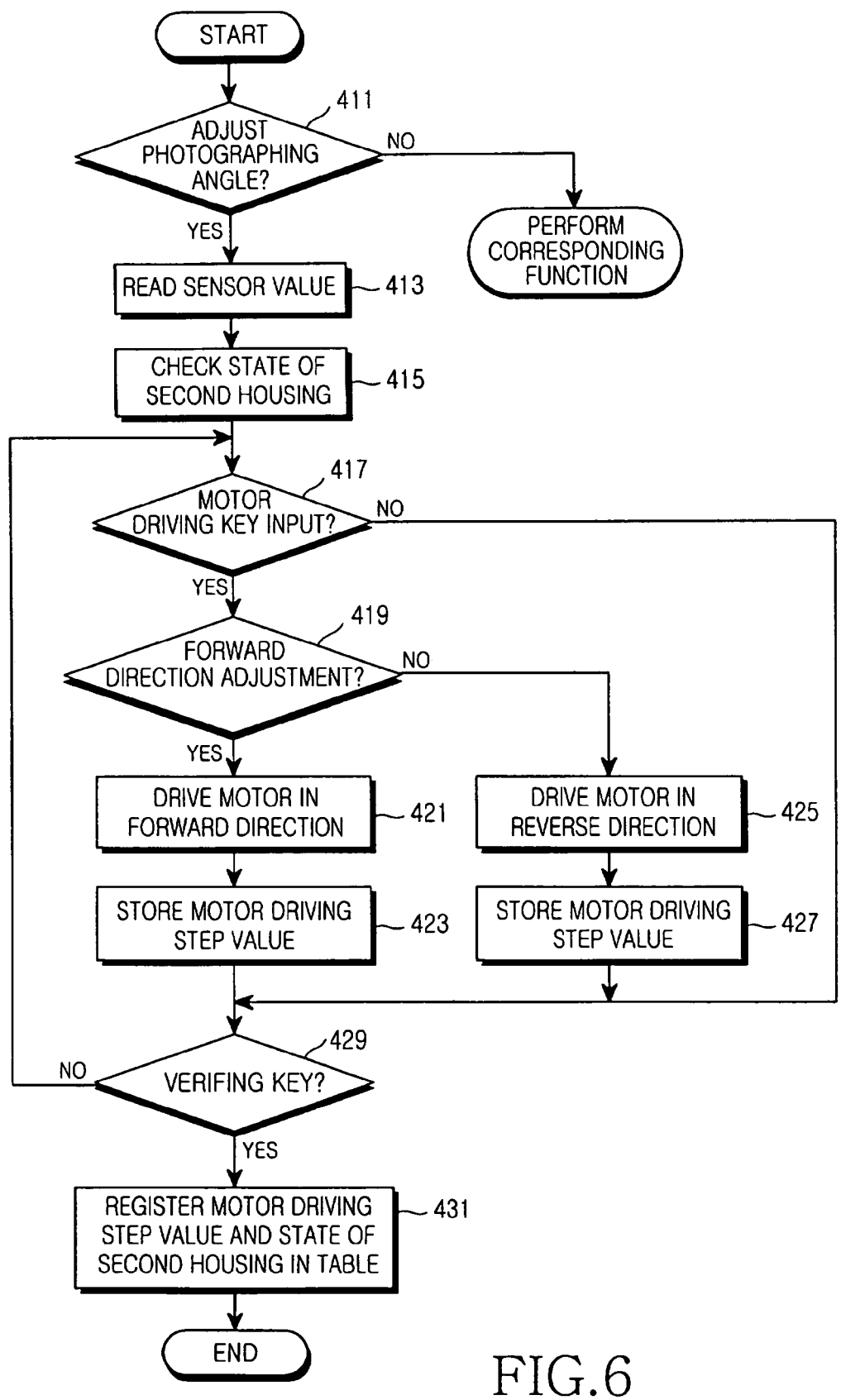
FIG. 6 is a flow chart showing an example procedure for registering a photographing angle of a camera by presetting the photographing angle of the camera depending on a status of the first and second housings according to a second embodiment of the present invention.
Figure 7:
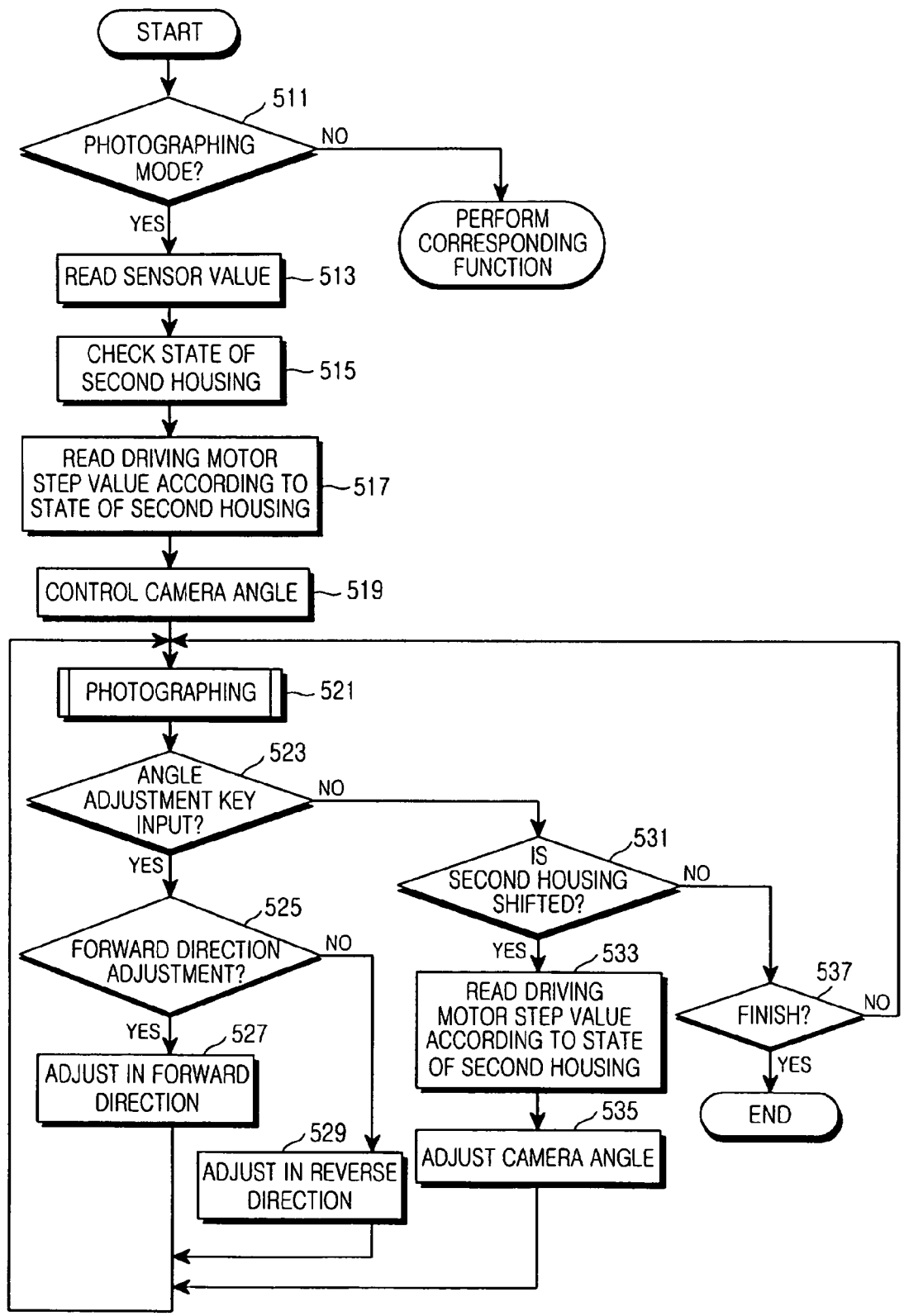
FIG. 7 is a flow chart showing an example procedure for automatically adjusting a photographing angle of a camera according to a second embodiment of the present invention.

The present invention relates to a system and method for automatically adjusting a photographing angle of the camera lens 50 depending on a status of the second housing 20. If the mobile terminal has a second housing, which cannot rotate with respect to a first housing, the third sensor 155 is not required. FIGS. 2 to 4 represent a structure of a portable terminal and a method for adjusting a photographing angle of a camera in the portable terminal according to a first embodiment of the present invention. In addition, FIGS. 5 to 7 represent a structure of a portable terminal and a method for adjusting a photographing angle of a camera in the portable terminal according to a second embodiment of the present invention.

According to the first embodiment of the present invention, when the open state of the second housing 20 is detected as shown in FIG. 1B, an angle of the camera is adjusted to a predetermined angle by controlling a camera driving motor. In addition, according to the second embodiment of the present invention, driving values of the camera driving motor are preset in relation with each state of the second housing 20. In this embodiment, after detecting the state of the second housing 20 when the portable terminal is in a photographing mode, a photographing angle of the camera is adjusted according to the state of the second housing 20.

FIG. 2 is a block diagram showing the structure of the portable terminal according to the first embodiment of the present invention as shown in FIGS. 1A to 1D.

Referring to FIG. 2, a radio frequency (RF) section 111 performs a wireless communication function of the portable terminal. The RF section 111 includes an RF transmitter for boosting and amplifying the frequency of a signal to be transmitted, and an RF receiver for dropping and low-noise amplifying frequency of a received signal. A data processing section 113 includes a transmitter for coding and modulating a signal to be transmitted and a receiver for decoding and demodulating a received signal. That is, the data processing section 113 consists of a MODEM and a CODEC. The CODEC includes a data CODEC for processing packet data and an audio CODEC for processing an audio signal, such as a voice signal. An audio circuit 119 reproduces the audio signal output from the audio CODEC in order to output the audio signal through speaker 22 (See FIGS. 1A to 1D), or transmits the audio signal generated from a microphone 14 (See FIGS. 1A to 1D), to the audio CODEC of the data processing section 113.

A key array 12 (See FIGS. 1A to 1D), includes basic keys for inputting characters and numerical information and various functional keys for setting various functions. In addition, the key array 12 has an adjustment key for adjusting the photographing angle of the camera and a photographing key for operating the camera. A memory 117 includes a program memory, a data memory and a motor driving table for storing information required for adjusting the photographing angle of the camera according to the first embodiment of the present invention. The program memory can store programs controlling general functions of the portable terminal and programs controlling the photographing angle of the camera according to the first embodiment of the present invention. The data memory temporarily stores data created while the above programs are being executed. The motor driving table is a buffer capable of storing motor driving data for controlling the operation of the camera according to the state of the second housing 20.

A control section 100 controls the operation of the portable terminal. The control section 100 may include the data processing section 113. In addition, the control section 100 adjusts the photographing angle of the camera according to the state of the second housing 20. The control section 100 outputs user data in order to display user data in a display 24 (See FIGS. 1A to 1D). User data includes first user data including a present time, a receive sensitivity, and a battery state, and second user data which are set by a user.

A camera module 171 photographs images and includes a camera sensor for converting an optical photographing signal into an electric signal, and a digital signal processor for converting the optical photographing signal output from the camera sensor into digital image data. The camera sensor includes a charge coupled device (CCD) sensor or a CMOS sensor capable of converting an optical signal into the electric signal. The digital signal processor converts an analog image signal into a digital image signal. The camera sensor is integrally formed with the digital signal processor, however, it is also possible to provide the camera sensor separate from the digital signal processor.

According to the first embodiment of the present invention, the camera sensor is separated from the digital signal processor in order to drive only a camera lens 50 of the camera module 171 when adjusting the photographing angle of the camera. Accordingly, an adjustment of the photographing angle of the camera module 171 means an adjustment of the camera lens 50 shown in FIGS. 1A to 1D.

An image processing section 173 is provided to generate screen data for displaying an image signal output from the camera module 171. The image processing section 173 processes the image signal output from the camera module 171 in a frame unit and outputs frame image data in accordance with the characteristic and size of the display 24.

In addition, the image processing section 173 includes an image CODEC, which compresses the image signal in a predetermined manner and restores compressed frame image data into original frame image data.

A selecting section 175 selects the image signals output from the image processing section 173 and/or user data output from the control section 100 under the control of the control section 100 in order to display image signals and/or user data in the display 24. The selecting section 175 includes a multiplexer accommodated in the image processing section 173.

The display 24 displays the frame image signals output from the image processing section 173 and user data output from the control section 100 in the screen thereof. In addition, the display 24 displays a moving picture signal reproduced under the control of the control section 100. The display 24 includes an LCD controller, a memory capable of storing image data, and an LCD device. In yet another embodiment, the display 24 can be a touch screen type LCD, and acts as an input section.

The first sensor 151 can be installed at a predetermined position in the second housing 20. According to the first embodiment of the present invention, the first sensor 151 is installed at a lower right portion of the second housing 20 as shown in FIG. 1B. In addition, the second sensor 153 can be installed at a predetermined position in the first housing 10. According to the first embodiment of the present invention, the second sensor 153 is installed at an upper right portion of the first housing 10 as shown in FIG. 1B. When the second housing 20 is in the closed position with respect to the first housing 10 as shown in FIG. 1A, the second sensor 153 faces the first sensor 151. As described above, the first sensor 151 includes the magnet and the second and third sensors 153 and 155 include Hall effect IC components. The Hall effect IC is a device for generating a logic signal by detecting a magnetic field applied thereto. According to the first embodiment of the present invention, the Hall effect IC generates a high logic signal in a normal state and generates a low logic signal when the magnetic field is applied thereto. Thus, when the second housing 20 is in the closed position with respect to the first housing 10, the second sensor 153 generates the low logic signal.

A motor driving section 161 is driven when the second sensor 153 generates the high logic signal, that is, when the second housing 20 moves away from the first housing 10 by a predetermined angle, in order to generate a motor driving signal. A motor 163 is then driven by means of the motor driving signal so as to rotate the lens of the camera module 171. When the motor driving signal is generated, the motor 163 rotates the lens of the camera module 171 such that a predetermined angle is formed between the lens and the second housing 20. Therefore, the camera module 171 can photograph an object while adjusting the angle of the lens at a predetermined angle.

As shown in FIGS. 1A to 1D, the display 24 and the speaker 22 are provided in the second housing 20 and the remaining components are arranged in the first housing 10.

Referring to FIG. 2, when it is required to transmit an outgoing call, a user inputs information regarding phone numbers through the key array 12. Upon detecting the outgoing call, the control section 100 processes information transmitted through the data processing section 113 and outputs an RF signal through the RF section 111. If the other subscriber responds to the outgoing call, the control section 100 detects it through the RF section 111 and the data processing section 113. The control section 100 then provides the communication by forming a communication route through the RF section 111, data processing section 113 and audio processing section 119.

In addition, when an incoming call is received, the control section 100 detects the incoming call through the data processing section 113 and generates a ring signal by controlling the audio processing section 119. If the user responds to the incoming call, the control section 100 detects it and provides the communication by forming a communication route through the audio processing section, data processing section 113 and RF section 111. Although the incoming call and outgoing call for voice communication has been explained, data communication for communicating packet data and image data can also be carried out. In addition, in a standby mode or when character communication is carried out, the control section 100 displays character data, which are processed through the data processing section 113, in the display 24.

If the portable terminal adopts a code division multiple access (CDMA) channel, the data processing section 113 is provided with a CDMA channel transceiver.

The portable terminal according to the first embodiment of the present invention can display or transmit persons or scenes as an image by photographing persons or scenes. The camera module 171 can be installed in the portable terminal or at an outer portion of the portable terminal. That is, the camera module 171 may be an internal type camera or an external type camera. The camera module 171 can be provided with the sensor for photographing the image, and the digital signal processor for converting the image signal into digital data. The sensor includes the CMOS sensor or the CCD. The image photographed by the camera module 171 is converted into an electric signal, and then converted into digital image data through the digital signal processor. In addition, signals synchronized with the converted digital image signals are output to the image processing section 173. The synchronized signals include a horizontal synchronization signal (Hsync) and vertical synchronization signal (Vsync).

At this time, the lens of the camera module 171 is controlled based on an output value of the first and second sensors 151 and 153. First, if the second housing 20 is in the closed position with respect to the first housing 10 as shown in FIG. 1A, the magnetic field of the first sensor 151 is applied to the second sensor 153 so that the second sensor 153 generates the low logic signal. Thus, the motor driving section 161 does not operate, and the motor 163 does not operate. Therefore, the camera module 171 maintains an initial state so that the photographing angle of the camera module 171 maintains an initial state forward, at a front of the portable terminal.

Then, if the second housing 20 moves to the open position as shown in FIG. 1B, the magnetic field of the first sensor 151 is not applied to the second sensor 153, so the second sensor 153 generates the high logic signal. In addition, if the photographing mode is selected, the control section 100 controls a route of the displayed image signal by utilizing the selecting section 175 in such a manner that the motor driving section 161 can be operated. Accordingly, the motor driving section 161 is operated corresponding to the output of the second sensor 153 under the control of the control section 100, thereby generating a motor driving signal. Thus, the motor 163 is driven. When the motor 163 is driven, the camera lens of the camera module 171 rotates by a predetermined angle from the initial state, so the camera module 171 is rotated at the predetermined photographing angle. At this time, the user can check the photographing image signal through the display 24.

According to the first embodiment of the present invention, the lens of the camera module 171 is automatically rotated by a predetermined angle if the folder, that is, the second housing, moves away from the body, that is, the first housing, by a predetermined distance so that the photographing angle of the camera module 171 can be automatically adjusted. Since the photographing angle of the camera module 171 can be automatically adjusted depending on the angle of the display 24, it is not required for the user to manually adjust the photographing angle of the camera.

FIG. 3 is a schematic showing an example circuit structure for controlling the photographing angle of the camera in the portable terminal as shown in FIG. 2.

Referring to FIG. 3, the second sensor 153 generates the low logic signal when the magnetic field is applied thereto. At this time, the second housing 20 maintains the closed position with respect to the first housing 10. Since the second sensor 153 generates the low logic signal, transistors 204 and 206 are turned off so that the motor driving signal is not generated.

However, when the second housing 20 moves to the open position, the second sensor 153 generates the high logic signal. In this state, if the user selects the photographing mode through the key array 12, the control section 100 generates a control signal in order to allow the motor 163 to rotate the lens of the camera module 171 by a predetermined angle. At this time, the photographing angle of the camera module 171 is determined based on the control signal of the control section 100. The control signal is adjusted in such a manner that the high logic state is maintained for a predetermined time for allowing the lens of the camera module 171 to be rotated by the predetermined angle. Then, the control section 100 converts the control signal such that the high logic signal of the second sensor 153 is shifted into the low logic signal, so the operation of the motor 163 is stopped.

In addition, when the second housing 20 moves to the open position, the lens of the camera module 171 is rotated by the predetermined angle so that the photographing angle of the camera module 171 is automatically adjusted. If the photographing angle of the camera module 171 does not precisely match a desired photographing angle, the user can finely adjust the photographing angle of the camera module 171 by handling the adjustment key in the key array 12.

FIG. 4 is a flow chart showing an example procedure for automatically adjusting the photographing angle of the camera module according to the first embodiment of the present invention.

Referring to FIG. 4, when the photographing key in the key array 12 is operated, the control section 100 detects the operation of the photographing key (S311). Then, the control section 100 checks whether or not the second housing 20 is in the open position by inspecting the output of the second sensor 153 (S313). At this time, if the second housing 20 is in the open position, the control section 100 generates the control signal for driving the motor driving section 161 (S315). Thus, the motor driving section 161 drives the motor 163 in relation with the output of the second sensor 153 under the control of the control section 100 in such a manner that the lens of the camera module 171 is rotated by the predetermined photographing angle.

Then, the control section 100 controls an operation of the photographing mode (S317). In the photographing mode, the image signal photographed by the camera module 171 is processed through the image processing section 173 and displayed in the display 24. In addition, user data generated from the control section 100 is displayed in the display 24.

At this time, the selecting section 175 outputs the image signal and user data by multiplexing the image signal and user data under the control of the control section so that the image signal and user data are simultaneously displayed in the display 24.

While the photographing mode is being carried out, it may be necessary to finely adjust the photographing angle of the lens of the camera module 171. In order to finely adjust the photographing angle, the adjustment key is provided in the key input section. When the adjustment key is operated, the control section 100 detects the operation of the adjustment key (S319) and determines whether the photographing angle must be adjusted in a forward direction or in a reverse direction. If the control section 100 determines that it is necessary to adjust the photographing angle in the forward direction in step 321, the control section 100 drives the motor in the forward direction so as to adjust the photographing angle of the lens of the camera module 171 (S323). However, if the control section 100 determines that it is necessary to adjust the photographing angle in the reverse direction in step 321, the control section 100 drives the motor in the reverse direction so as to adjust the photographing angle of the lens of the camera module 171 (S325).

The above process is continuously carried out until the photographing mode has been finished. When the photographing mode has been finished, the control section 100 detects the completion of the photographing mode (S327) and returns the lens of the camera module 171 to its initial position.

FIG. 5 is a block diagram showing an example structure of a portable terminal according to the second embodiment of the present invention. According to the second embodiment of the present invention, the second housing 20 can rotate with respect to the first housing 10 as shown in FIGS. 1C and 1D. However, the second embodiment of the present invention can be adaptable to the portable terminal, in which the second housing 20 does not rotate with respect to the first housing 10.

Referring to FIG. 5, the first sensor 151 can be installed at a predetermined position in the second housing 20. According to the second embodiment of the present invention, the first sensor 151 is installed at a lower right portion of the second housing 20 as shown in FIG. 1B. The second sensor 153 can be installed at a first predetermined position in the first housing 10. According to the second embodiment of the present invention, the second sensor 153 is installed at an upper right portion of the first housing 10 as shown in FIG. 1B. When the second housing 20 is in the closed position with respect to the first housing 10, as shown in FIG. 1A, the second sensor 153 faces the first sensor 151. The third sensor 155 can be installed at a second predetermined position in the first housing 10. According to the second embodiment of the present invention, the third sensor 155 is installed at an upper left portion of the first housing 10 as shown in FIG. 1B. When the second housing 20 is placed on the first housing 10 after the second housing 20 has been rotated at an angle of 180° with respect to the first housing 10 as shown in FIG. 1D, the third sensor 155 faces the first sensor 151. As described above, the first sensor 151 includes the magnet and the second and third sensors 153 and 155 include Hall effect IC components. The Hall effect IC is a device for generating a logic signal by detecting a magnetic field applied thereto. According to the second embodiment of the present invention, the Hall effect IC generates a high logic signal in a normal state and generates a low logic signal when the magnetic field is applied thereto. Thus, when the second housing 20 is in the closed position with respect to the first housing 10, the second sensor 153 or the third sensor 155 generates the low logic signal.

A step motor is used as the motor 163 controlling a rotation of the lens of the camera module 171. In addition, the control section 100 checks the state of the second housing 20 according to output values of the second and third sensors 153 and 155 and outputs motor driving data based on the state of the second housing 20. A motor driving section 161 drives the motor 163 based on motor driving data output from the control section 100 so as to control the rotation degree of the lens of the camera module 171. When the motor driving signal is generated, the motor 163 rotates the lens of the camera module 171 such that a predetermined angle is formed between the lens and the second housing 20. Therefore, the camera module 171 can photograph an object while adjusting the angle of the lens at a predetermined angle.

As shown in FIGS. 1A to 1D, the display 24 and the speaker 22 are provided in the second housing 20 and the remaining components are arranged in the first housing 10.

The structure and operation of the portable terminal according to the second embodiment of the present invention is similar to those of the portable terminal according to the first embodiment, and the same elements have the same reference numerals.

According to the second embodiment of the present invention, a proper photographing angle of the camera module 171 is preset according to the status of the second housing 20. When the portable terminal is in the photographing mode, the state of the second housing 20 is first checked, and the photographing angle of the camera module 171 is automatically adjusted according to the state of the second housing 20 before photographing the object. To this end, according to the second embodiment of the present invention, a procedure for registering the photographing angle of the camera module 171 as shown in FIG. 6 and a procedure for automatically adjusting the photographing angle of the camera module 171 in the photographing mode as shown in FIG. 7 may be carried out.

FIG. 6 is a flow chart showing the procedure for registering the photographing angle of the camera module by presetting the photographing angle of the camera depending on the states of the first and second housings according to the second embodiment of the present invention.

According to the second embodiment of the present invention, sensors as shown in FIG. 1B are installed in the first and second housing 10 and 20. In this case, the registration for motor driving data according to the photographing angle of the camera module 171 is carried out when the second housing 20 is in the state as shown in FIG. 1B or FIG. 1D.

Referring to FIG. 6, when the user selects a mode for adjusting the photographing angle of the camera module 171 by using the key array 12, the control section 100 detects the mode selection (S411) and reads output values of the second and third sensors 153 and 155 (S413). Then, the control section 100 checks the status of the second housing 20 based on the output values of the second and third sensors 153 and 155 (S415).

After checking the status of the second housing 20, the control section 100 determines the photographing angle of the camera module 171 in the photographing mode (S417 to S431). That is, when the user operates an angle adjustment key provided in the key array 12, the control section 100 detects the operation of the angle adjustment key (S417) and determines whether the photographing angle must be adjusted in a forward direction or in a reverse direction. If it is required to adjust the photographing angle in the forward direction, the control section 100 detects it in step 419 and outputs motor driving data for driving the motor 163 in the forward direction by one-step (S421). In addition, the control section 100 updates and stores the accumulated values of motor driving data (S423). In addition, if it is required to adjust the photographing angle in the reverse direction, the control section 100 detects it in step 419 and outputs motor driving data for driving the motor 163 in the reverse direction by one-step (S425). In addition, the control section 100 updates and stores the accumulated values of motor driving data (S427).

That is, the user continuously adjusts the photographing angle of the camera module 171 by using the angle adjustment key and repeatedly checks the adjusted photographing angle through the display 24. At this time, if the photographing angle of the camera module 171 displayed in the display 24 satisfies the user, the user pushes a verifying key provided in the key array 12. When the verifying key is operated, the control section 100 detects the operation of the control section 100 (S429) and registers the status of the second housing 20 detected in step 415 and accumulated values of motor driving data updated in step 427 in the motor driving table. After that, the control section 100 finishes the procedure.

At this time, the registration for the motor driving data value is carried out when the second housing 20 is in the state as shown in FIG. 1B representing the open position of the second housing 20 or in FIG. 1D representing the closed position of the second housing 20 after the second housing 20 has been rotated by an angle of 180° with respect to the first housing 10. When the second housing 20 is in the state as shown in FIG. 1B or FIG. 1D, the user can view the display 24. In this state, if the user performs the procedure shown in FIG. 6, a proper photographing angle of the camera module 171 according to each state of the second housing can be registered.

In addition, it is possible for the portable terminal to photograph an object even if the second housing 20 has been rotated as shown in FIG. 1C. However, when the sensors are installed as shown in FIG. 1B, it is difficult to detect the status of the second housing 20 if the second housing 20 is aligned as shown in FIG. 1C. In order to detect the status of the second housing 20 aligned as shown in FIG. 1C, it is required to install a fourth sensor at a predetermined position of the hinge arms 30, 10a and 10b for detecting the rotation of the second housing 20, and/or to install the fourth sensor between the second and third sensors 153 and 155 of the first housing 10 for detecting the rotation of the second housing 20. If the procedure shown in FIG. 6 is carried out while detecting the rotation of the second housing through the fourth sensor installed as described above, it is possible to automatically adjust the photographing angle of the camera module 171 even if the second housing 20 is aligned as shown in FIG. 1C.

FIG. 7 is a flow chart showing an example procedure for automatically adjusting the photographing angle of the camera module according to the second embodiment of the resent invention.

Referring to FIG. 7, when the photographing key provided in the key array 12 is operated, the control section 100 detects the operation of the photographing key (S511) and reads the output values of the second and third sensors 153 and 155 (S513), thereby checking the status of the second housing 20. In addition, the control section 100 reads the motor driving data value according to the state of the second housing 20 from the table of the memory section 117 (S517) and outputs the motor driving data value so as to automatically adjust the photographing angle of the camera module 171 (S159). That is, when the second housing 20 is in the open position as shown in FIG. 1B or in the closed position as shown in FIG. 1D, or in a rotated position as shown in FIG. 1C in steps 517 and 519, the control section 100 performs the procedure as shown in FIG. 6 so as to output the motor driving data value preset in the motor driving table, so that the motor driving section 161 generates the motor driving signal for driving the motor 163.

After that, the control section 100 controls the photographing mode (S521). In the photographing mode, the image signal photographed by the camera module 171 is processed through the image processing section 173 and displayed in the display 24. In addition, user data generated from the control section 100 is displayed in the display 24. At this time, the selecting section 175 outputs the image signal and user data by multiplexing the image signal and user data under the control of the control section 100 so that the image signal and user data are simultaneously displayed in the display 24.

While the photographing mode is being carried out, it may be necessary to finely adjust the photographing angle of the lens of the camera module 171. To this end, the adjustment key is provided in the key input section. When the adjustment key is operated, the control section 100 detects the operation of the adjustment key (S523) and determines whether the photographing angle must be adjusted in a forward direction or in a reverse direction. If the control section 100 determines that it is necessary to adjust the photographing angle in the forward direction in step 525, the control section 100 drives the motor in the forward direction so as to adjust the photographing angle of the lens of the camera module 171 (S527). However, if the control section 100 determines that it is necessary to adjust the photographing angle in the reverse direction in step 525, the control section 100 drives the motor in the reverse direction so as to adjust the photographing angle of the lens of the camera module 171 (S529). That is, when it is required to adjust the photographing angle of the camera module 171 while photographing an image by using the camera module 171, the user can adjust the photographing angle of the camera module 171 by utilizing the angle adjustment key.

In addition, if the state of the second housing 20 is shifted while the photographing mode is being carried out, the control section 100 detects the shifted state of the second housing 20 based on a variation of the sensor value (S531) and reads the motor driving data value according to the shifted state of the second housing (S533). After that, the control section outputs motor driving data so as to automatically adjust the photographing angle of the camera module 171.

When it is necessary to adjust the angle of the camera module 171 during the photographing mode, the control section 100 returns the lens of the camera module 171 to its initial position and adjusts the photographing angle of the camera module 171 to a predetermined photographing angle. In addition, if it is necessary to adjust the photographing angle of the camera module 171 during the photographing mode, the control section 100 checks the present angle of the camera module 171 and the motor driving data value according to the present angle of the camera module 171 so as to adjust the photographing angle of the camera module 171. That is, since the control section 100 already knows the driving data value of the motor 163 for controlling the photographing angle of the camera module 171, the control section 100 also knows the present photographing angle of the camera module 171. Therefore, even if the state of the second housing 20 is shifted, the control section may know the present motor driving data value, so the control section 100 can adjust the photographing angle of the camera module 171.

As described above, the present invention can automatically adjust the photographing angle of the camera module equipped in the portable terminal. In addition, the photographing angle of the camera module is automatically adjusted during the photographing mode according to the state of the display section of the portable terminal. Thus, the user may finely adjust the photographing angle of the camera module as necessary.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for controlling a camera in a portable terminal, wherein the terminal includes a first housing having the camera and a second housing having a display section, the apparatus comprising:
   a first sensor installed at a first predetermined position of the second housing;
   a second sensor installed at a second predetermined position of the first housing in such a manner that the second sensor faces the first sensor when the second housing is in a closed position with respect to the first housing and generating on/off signals depending on a relationship with respect to the first sensor;
   a motor driving section for receiving a predetermined photographing angle and automatically generating a motor driving signal to adjust a photographing angle of a lens of the camera to the predetermined photographing angle when a signal representing an opening of the second housing is generated from the second sensor; and
   a motor for rotating the lens of the camera according to the motor driving signal.

2. The apparatus as claimed in claim 1, wherein the first sensor includes a magnet and the second sensor includes a Hall effect IC.

3. The apparatus as claimed in claim 1, further comprising a memory for storing a motor driving table, wherein the motor driving table stores at least one predetermined photographing angle.

4. The apparatus as claimed in claim 1, wherein the predetermined photographing angle is based upon accumulated motor driving data.

5. The apparatus as claimed in claim 1, further comprising an adjustment key for finely adjusting the predetermined photographing angle.

6. A method for controlling a camera of a portable terminal including a second housing having a display section and a first sensor installed at a first predetermined position of the second housing, and a first housing having the camera and a second sensor installed at a second predetermined position of the first housing in such a manner that the second sensor faces the first sensor when the second housing is in a closed position with respect to the first housing, the method comprising the steps of:
   i) storing and/or updating a predetermined photographing angle and detecting a state of the second housing in a photographing mode based on a signal generated from the second sensor;
   ii) automatically adjusting a photographing angle of a lens of the camera to the predetermined photographing angle when the second housing is in an open position with respect to the first housing;
   iii) displaying an image signal photographed at an adjusted photographing angle of the lens of the camera; and
   iv) returning the lens of the camera to an initial position of the lens when the photographing mode is finished.

7. The method as claimed in claim 6, further comprising the step of finely adjusting the photographing angle of the lens of the camera when an angle adjustment key is input while displaying the photographed image signal.

8. The method as claimed in claim 7, further comprising the steps of:
   accumulating data of the fine adjustments; and
   storing and/or updating a predetermined photographing angle based on the accumulated data.

9. The method as claimed in claim 6, further comprising the step of storing and/or updating the predetermined photographing angle in a motor driving table.

10. A method for controlling a camera of a portable terminal including a second housing having a display section and a first sensor installed at a first predetermined position of the second housing, and a first housing having the camera and a second sensor installed at a second predetermined position of the first housing in such a manner the second sensor faces the first sensor when the second housing is in a closed position with respect to the first housing, the method comprising the steps of:
   i) storing and/or updating predetermined data and detecting a state of the second housing in a photographing mode based on a signal generated from the second sensor;
   ii) automatically adjusting a photographing angle of a lens of the camera according to the predetermined data depending on a state of the second housing; and
   iii) displaying an image signal photographed at an adjusted photographing angle of the lens of the camera, wherein, the photographing angle of the lens of the camera is adjusted according to the predetermined data corresponding to a shifted state of the second housing when the state of the second housing is shifted, and the image signal is repeatedly displayed.

11. The method as claimed in claim 10, further comprising the step of storing and/or updating the predetermined data in a motor driving table.

* * * * *